(12) United States Patent
Vered

(10) Patent No.: US 6,540,158 B1
(45) Date of Patent: Apr. 1, 2003

(54) DOUBLE-LINE IRRIGATION HOSE

(75) Inventor: Eli Vered, Hefer (IL)

(73) Assignee: Netafim (A.C.S.) Ltd., Tel Aviv (IL)

( * ) Notice: Subject to any disclaimer, the term of this patent is extended or adjusted under 35 U.S.C. 154(b) by 0 days.

(21) Appl. No.: 09/688,100

(22) Filed: Oct. 16, 2000

(51) Int. Cl.$^7$ .............................................. B05B 15/00
(52) U.S. Cl. ...................................... 239/450; 239/542
(58) Field of Search ................................ 239/542, 450, 239/266, 547, 533.1; 138/42, 43, 46

(56) References Cited

U.S. PATENT DOCUMENTS

| | | | | |
|---|---|---|---|---|
| 2,566,833 A | * | 9/1951 | Healy .......................... | 239/266 |
| 2,749,180 A | * | 6/1956 | Andrews ..................... | 156/218 |
| 3,361,359 A | | 1/1968 | Chapin | |
| 3,672,571 A | | 6/1972 | Goodricke | |
| 3,860,177 A | * | 1/1975 | Huffaker ..................... | 239/450 |
| 3,860,179 A | | 1/1975 | Costa | |
| 4,047,995 A | | 9/1977 | Leal-Diaz | |
| 4,199,106 A | | 4/1980 | Kojimoto et al. | |
| 4,247,051 A | | 1/1981 | Allport | |
| 4,354,639 A | | 10/1982 | Delmer | |
| 4,384,680 A | * | 5/1983 | Mehoudar .................. | 239/542 |
| 4,474,330 A | * | 10/1984 | Langa ........................ | 239/450 |
| 4,573,640 A | * | 3/1986 | Mehoudar .................. | 239/542 |

OTHER PUBLICATIONS

Dry et al., "Vine manipulation to meet fruit specifications", *Proceedings Tenth Australian Wine Industry Technical Conference,* (1999), pp. 208–241.

Loveys et al., "Partial rootzone drying stimulates stress responses in grapevine to improve water use efficiency while maintaining crop yield and quality", *Austrian Grapegrower & Winemaker, Annual Technical Issue,* (1998), pp. 108–110 and 113.

Dry et al., "Partial rootzone drying–an update", *Austrian Grapegrower & Winemaker, Annual Technical Issue,* (2000), pp. 35–39.

\* cited by examiner

*Primary Examiner*—Lisa A. Douglas
(74) *Attorney, Agent, or Firm*—Browdy and Neimark, P.L.L.C.

(57) ABSTRACT

An irrigation system comprises an irrigation hose made of synthetic resin and having at least two integrally formed elongated irrigation lines, and irrigation emitters. Each line comprises a separate fluid passage adapted for individual communication with a water supply source, and a succession of spaced apart irrigation openings formed therein. Each opening is associated with an irrigation emitter having an irrigation outlet, the irrigation outlets of the emitters of the lines being staggered with respect to each other.

18 Claims, 2 Drawing Sheets

DOUBLE-LINE IRRIGATION HOSE

FIELD OF THE INVENTION

This invention relates to irrigation hoses made of synthetic resin and particularly, to such hoses having integrally formed plurality of fluid passages.

BACKGROUND OF THE INVENTION

The main application of the present invention is its use in irrigation of such plants as grapevine, where partial rootzone drying is employed. Researches performed in this respect show that such rootzone drying that is obtained by withholding the irrigation in a controlled manner, improves water use efficiency while maintaining crop yield and quality. These researches have been reported by P. R. Dry et al, for example in *"Vine manipulation to meet fruit specification"*, in Proceedings 10$^{th}$ Australian Wine Industry Technical Conference, Sydney, Australia, 208–241, 1999; and *"Partial rootzone drying-update"*, the Australian Grapegrower & Winemaker, Annual Technical Issue 2000, 35–39.

As described in the above papers, the authors used in their researches standard drip emitters two per vine, for the irrigation thereof in turn on two sides of the vine so that when one side of the vine is watered the other one is allowed to dry. The emitters were placed on two sub-surface drip lines on each side of the vine row at a certain depth and distance from the center of the row.

Suggestions have also been made to dispose similar parallel drip lines above the ground along the rows of vine shoots at a certain height therefrom.

With the disposition of the drip lines in the manners described above, it is important that the emitters irrigating each vine and, consequently, the drip lines carrying the emitters, be fixed and accurately maintained in a predetermined mutual disposition, which is not easy to achieve.

SUMMARY OF THE INVENTION

According to the present invention, there is provided an irrigation system comprising an irrigation hose made of synthetic resin and having at least two integrally formed elongated irrigation lines, each line comprising a separate water passage adapted for individual communication with a water supply source, and a succession of spaced apart irrigation openings formed therein, each opening being associated with an irrigation emitter having an irrigation outlet, the irrigation outlets of the emitters of said lines being staggered with respect to each other.

The emitters used with the irrigation hose of the present invention may have any appropriate design, e.g. they may be drip irrigation emitters or mini-sprinklers. Drip Irrigation emitters may be mounted either inside the irrigation lines so as to have their irrigation outlets connected to said openings (built-in internal or in-line emitters), or outside the lines so as to have their inlets connected with said openings (external or on-line emitters). Also, different lines of the hoses and/or different openings of each line may carry different types of emitters or emitters of the same type but having different characteristics. Consequently, the two lines and/or their openings may have different diameters.

The staggered arrangement of the irrigation outlets of the emitters may be obtained in different ways. One example in accordance with the present invention is forming the hose's irrigation lines with staggered irrigation openings and using the irrigation emitters having outlets aligned with the irrigation openings. These emitters may be in- or on-line emitters whose inlets and outlets are both aligned with the associated irrigation openings, or rather they may be in-line drip irrigation emitters whose inlets are spaced from their outlets by an elongated fluid passageway extending in the direction along the hose's length.

Alternatively, on-line drip irrigation emitters may be used whose inlets are, and whose outlets are not, aligned with their associated openings, the outlets being spaced from the inlets by an elongated fluid passageway extending in the direction of the hose's length.

The irrigation outlets of each irrigation line may be arranged in emitting groups including at least two adjacent outlets which may be associated with one or more irrigation emitters and with one or more openings in the irrigation line.

The emitters' outlets or groups of outlets are preferably arranged in successive pairs of staggered outlets, and the staggered outlets of each pair are spaced by such a staggering distance as to enable their in-turn use for irrigation of a plant located therebetween. Thereby, when the outlet or group of outlets of one line are operative to irrigate the soil on one side of the plant, the outlet or group of outlets of the other line are inoperative to allow the soil on the other side of the plant to dry. However, for other irrigation regimes, the staggered arrangement of the outlets of the two lines may be different. For example, if the irrigation outlets of the two lines are used for different kinds of irrigation of the same plant, e.g. for drip irrigation and for sprinkling, the irrigation outlets are arranged so that a group of drip irrigation emitters of the drip irrigation line constitutes a pair with one or more mini-sprinkler of the sprinkling line. In this case, the outlets in each line may be spaced uniformly by distances that are different in the two lines.

It should be noted that irrigation double-passage hoses are generally known to provide two passages communication therebetween. Such a hose is disclosed, for example, in U.S. Pat. No. 4,199,106, where one passage is an irrigation or supply passage and the other one is a constant pressure passage, the passages constituting in combination one irrigation line.

With the irrigation hose according to the present invention, the two passages belong to different irrigation lines whose emitters are permanently kept in fixed mutual disposition, independent of the positioning of the hose when installed and of the maintenance of the hose, and whose installation is essentially labor saving compared with that of two separate irrigation hoses.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
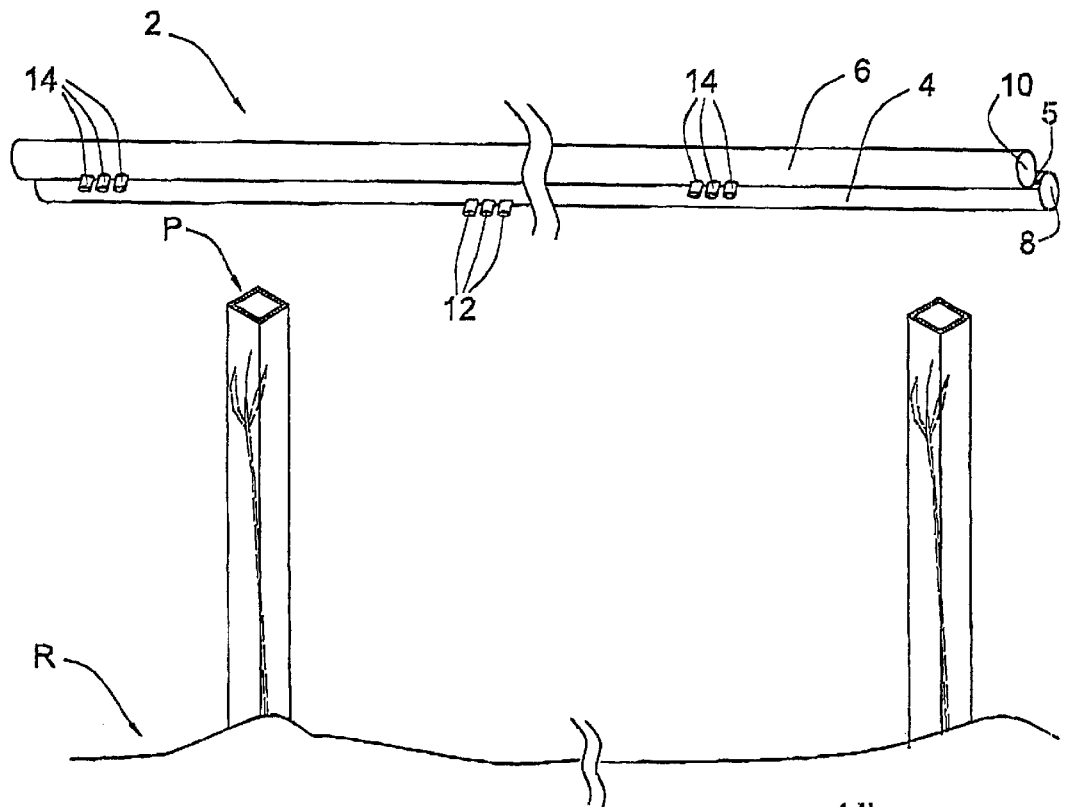
FIG. 1 is a schematic perspective view of an irrigation hose according to the present invention.
Figure 2:
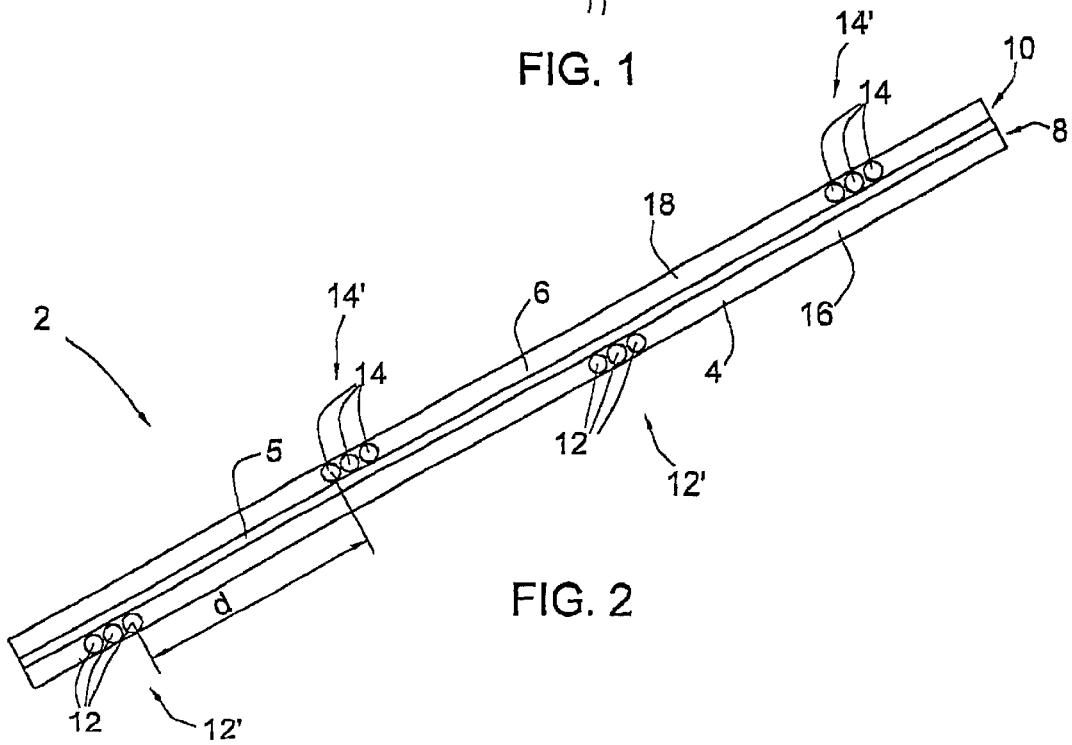
FIG. 2 is a plan view of the irrigation hose of FIG. 1, when seen from the bottom.

FIGS. 1 and 2 schematically illustrate an irrigation system according to the present invention, comprising a synthetic resin double-line irrigation hose and irrigation emitters, for the irrigation of a row R of plants P (only two being shown) such as grapevine shoots. The emitters may be mounted inside or outside the irrigation hose and, since their design does not constitute subject matter of the present application, they are shown in FIGS. 1 and 2 schematically as irrigation outlets.

As seen in FIGS. 1 and 2, the irrigation hose 2 has integrally formed first and second irrigation lines 4 and 6 having a joining web 5 therebetween and having respective first and second water passages 8 and 10. The joining web 5 may have any dimensions and shape and may even not exist, if the irrigation lines are joined by their common wall. The passages 8 and 10 are hydraulically completely isolated from each other and are each adapted for individual communication with a water supply source whose valve is capable of switching the water supply from one passage to the other at predetermined time intervals.

Each of the first and second irrigation lines 4 and 6 are formed with openings (not seen) in respective walls 16 and 18 of the irrigation lines that are simultaneously seen in a plan view of the irrigation hose 1, as in FIG. 2. The openings are associated with irrigation emitters shown as respective irrigation outlets 12 and 14. The outlets 12 and 14 are arranged in groups 12' and 14' that are staggered with respect to each other and are spaced by a staggering distance d.

Figure 3:
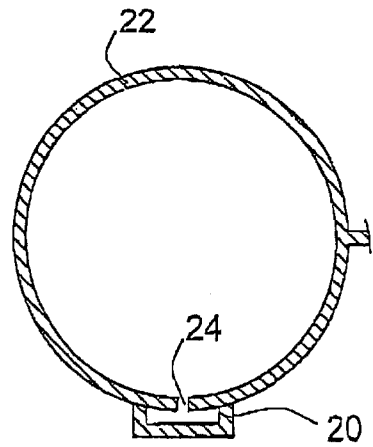
FIG. 3 is an enlarged cross-sectional view of one irrigation line of an irrigation hose according to one embodiment of the present invention, taken through its irrigation opening that has an external emitter mounted thereto.
Figure 4:
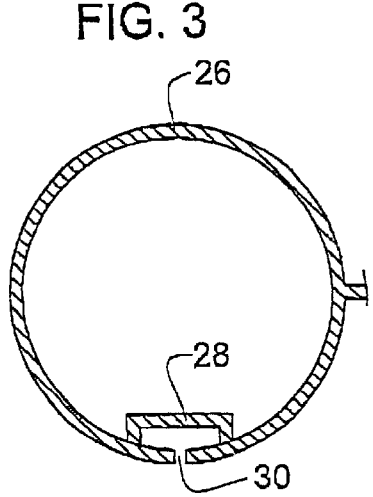
FIG. 4 is an enlarged cross-sectional view of one irrigation line of an irrigation hose according to another embodiment of the present invention, taken through its irrigation opening that has an internal built-in emitter.

FIGS. 3 and 4 illustrate possible ways of mounting the irrigation emitters to the irrigation hose shown in FIGS. 1 and 2, either externally or internally. In both cases, the emitters are shown in FIGS. 3 and 4 schematically since they may be of any appropriate design and particularly, they may be standard drip irrigation emitters known in the art for similar applications.

Figure 5:
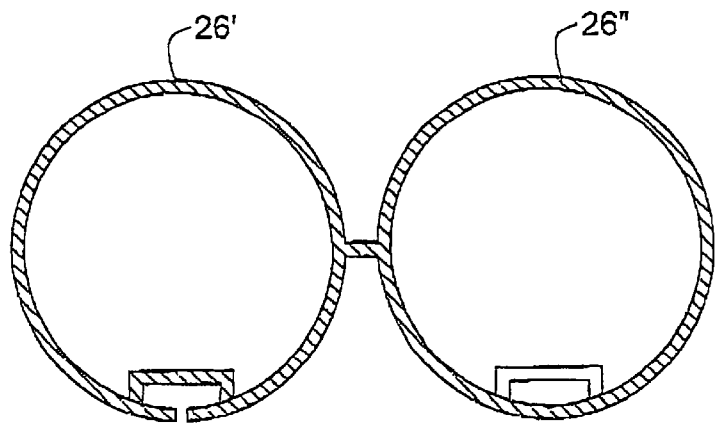
FIG. 5 is an enlarged cross-sectional view of an irrigation hose according to the present invention, having irrigation lines designed as shown in FIG. 4.

More particularly, FIG. 3 illustrates an external emitter 20 mounted outside its associated irrigation line designated in this Figure as 22, so that the emitter's inlet 24 is aligned with the opening of the irrigation line 22. The emitter's outlet (not shown) may or may not be aligned with its inlet 24. In FIG. 4, an irrigation line 26 has an internal built-in emitter 28 whose outlet 30 is aligned with the opening of the irrigation line 26. The emitter's inlet (not shown) may or may not be aligned with its outlet 30. FIG. 5 illustrates a cross-sectional view of the irrigation hose with both irrigation lines 26' and 26" having staggered internal emitters.

Reverting to FIG. 1, in operation the irrigation hose 1 is installed relative to the row of plants R so that each plant P is associated with one group 12' of emitters from the irrigation line 4, disposed on one side thereof, and one group 14' of emitters from the irrigation line 6, disposed on the other side thereof. The lines 4 and 6 communicate with the water source in turn so that, when the line 4 and its emitters are operative to irrigate the soil on one side of the plant P, the line 6 and its emitters are inoperative to allow the soil on the other side of the plant to dry, and vice versa.

Clearly, the general design of the irrigation hose of the present invention, its mode of use and the geometry of its lines, passages and irrigation openings may be different from those described above and shown in the drawings, as far as they stay in the framework of the claims.

What is claimed is:

1. An irrigation system comprising an irrigation hose, the hose being made of synthetic resin and having at least two integrally formed elongated irrigation lines, each line comprising a separate fluid passage adapted for individual communication with a water supply source, and a succession of spaced apart irrigation openings formed therein, each opening being associated with an irrigation emitter having an irrigation outlet, the irrigation outlets of the emitters of said lines being alternately staggered with respect to each other between the irrigation lines.

2. An irrigation system according to claim 1, wherein at least one irrigation emitter of at least one of said irrigation lines has an outlet aligned with the associated irrigation opening.

3. An irrigation system according to claim 2, wherein said at least one emitter is mounted inside said irrigation line.

4. An irrigation system according to claim 2, wherein said at least one emitter is mounted outside said irrigation line.

5. An irrigation system according to claim 1, wherein at least one irrigation emitter of at least one of said irrigation lines is mounted outside said irrigation line and has an inlet aligned with the associated irrigation opening and an outlet spaced from said inlet in the direction along the length of the hose.

6. An irrigation system according to claim 1, wherein said outlets of the irrigation emitters are disposed in walls of the lines that are simultaneously seen in a plan view of the hose.

7. An irrigation system according to claim 1, wherein said outlets of the irrigation emitters of the two lines form at least one pair of at least one first emitter of one of the lines and at least one second emitter of the other line, the outlets of the first and second emitters being spaced apart to irrigate a plant located therebetween, enabling the irrigation on one side of said plant via the outlet of the first emitter and the irrigation on the other side of said plant via the outlet of the second emitter.

8. An irrigation system according to claim 1, wherein said irrigation lines are designed for different irrigation regimes and carry different kinds of emitters.

9. An irrigation hose made of synthetic resin and having at least two integrally formed elongated irrigation lines, each line comprising a separate fluid passage adapted for individual communication with a water supply source, and a succession of spaced apart irrigation openings formed therein, the openings of the two lines being alternately staggered with respect to each other between the irrigation lines.

10. An irrigation hose according to claim 9, wherein said irrigation openings are formed in walls of the lines that are simultaneously seen in a plan view of the hose.

11. An irrigation hose according to claim 9, wherein irrigation openings of the two lines form at least one pair of at least one first outlet of one of the lines and at least one second outlet of the other line, the first and second outlets being spaced apart to irrigate a plant located therebetween via the outlets of one of said lines and irrigation of the soil on the other side of the plant via outlets of the other line.

12. An irrigation system comprising an irrigation hose having at least two integrally formed elongated irrigation lines, each line comprising a separate fluid passage adapted for individual communication with a water supply source, and a succession of spaced apart irrigation openings formed therein, each opening being associated with an individual irrigation emitter having an irrigation outlet, the irrigation outlets of the emitters of said lines being alternately staggered with respect to each other between the irrigation lines.

13. An irrigation hose made of synthetic resin and having at least two integrally formed elongated irrigation lines, each line comprising a separate fluid passage adapted for individual communication with a water supply source, and a succession of spaced apart irrigation openings formed therein, the irrigation openings of said lines being staggered with respect to each other, each opening being adapted for the association with an individual irrigation emitter.

14. An irrigation system comprising an irrigation hose having at least two integrally formed elongated irrigation lines for irrigation of soil adjacent at least one plant, each line comprising a separate fluid passage adapted for individual communication with a water supply source, and a succession of spaced apart irrigation openings formed therein, each opening being associated an irrigation emitter having an irrigation outlet, said two lines differing from each other in the location of the irrigation outlets, enabling the irrigation outlets of the emitters of one of the two lines and the irrigation outlets of the emitters of the other line to be used for irrigation of different areas of said soil.

15. An irrigation hose made of synthetic resin and having at least two integrally formed elongated irrigation lines for irrigation of soil surrounding at least one plant, each line comprising a separate fluid passage adapted for individual communication with a water supply source, and a succession of spaced apart irrigation openings formed therein, each opening being adapted for the association with its individual irrigation emitter, said two lines differing from each other in the location of the irrigation openings, enabling the irrigation openings of one of the two lines and the irrigation openings of the other line to be used for the irrigation of different areas of said soil.

16. An irrigation system comprising an irrigation hose, the hose being made of synthetic resin and having at least two integrally formed elongated irrigation lines with a joining web therebetween, each line comprising a separate fluid passage adapted for individual communication with a water supply source, and a succession of spaced apart irrigation openings formed therein, each opening being associated with an irrigation emitter having an irrigation outlet, the irrigation outlets of the emitters of said lines being alternately staggered with respect to each other between the irrigation lines, said web being free of any irrigation openings.

17. An irrigation hose made of synthetic resin and having at least two integrally formed elongated irrigation lines with a joining web therebetween, each line comprising a separate fluid passage adapted for individual communication with a water supply source, and a succession of spaced apart irrigation openings formed therein, the openings of the two lines being alternately staggered with respect to each other between the irrigation lines and said web being free of any irrigation openings.

18. A method for irrigation of a soil around a plant, comprising

- providing an irrigation hose made of synthetic resin and having at least two integrally formed elongated irrigation lines, each line comprising a separate fluid passage adapted for individual communication with a water supply source, and a succession of spaced apart irrigation openings formed therein, the openings of the two lines being alternately staggered with respect to each other between the irrigation lines;
- using the irrigation openings of one of the lines for the irrigation of said soil at areas different from areas irrigated via the irrigation openings of the other line.

* * * * *